United States Patent
Wu et al.

(10) Patent No.: US 6,426,971 B1
(45) Date of Patent: *Jul. 30, 2002

(54) SYSTEM AND METHOD FOR ACCURATELY PREDICTING SIGNAL TO INTERFERENCE AND NOISE RATIO TO IMPROVE COMMUNICATIONS SYSTEM PERFORMANCE

(75) Inventors: Qiang Wu; Peter J. Black; Nagabhushana T. Sindhushayna, all of San Diego, CA (US)

(73) Assignee: QUALCOMM Incorporated, San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/394,980

(22) Filed: Sep. 13, 1999

(51) Int. Cl.[7] .......................... H04B 17/00; H04B 3/46; H04Q 1/20
(52) U.S. Cl. ..................... 375/227; 375/222; 375/225
(58) Field of Search ............................. 375/227, 221, 375/222, 225, 285; 455/226.3

(56) References Cited

U.S. PATENT DOCUMENTS

| 5,414,796 A |   | 5/1995  | Jacobs et al.   |         |
|-------------|---|---------|-----------------|---------|
| 5,541,955 A | * | 7/1996  | Jacobsmeyer     |         |
| 6,002,715 A | * | 12/1999 | Brailean et al. | 375/227 |
| 6,154,489 A | * | 11/2000 | Kleider et al.  | 375/221 |

FOREIGN PATENT DOCUMENTS

EP            0899906          3/1999

* cited by examiner

Primary Examiner—Chi Pham
Assistant Examiner—Phuong Phu
(74) Attorney, Agent, or Firm—Philip Wadsworth; Kent D. Baker; Byron Yafuso

(57) ABSTRACT

A system for providing an accurate prediction of a signal-to-interference noise ratio is described. The system includes a first circuit for receiving a signal transmitted across a channel via an external transmitter. A second circuit generates a sequence of estimates of signal-to-interference noise ratio based on the received signal. A third circuit determines a relationship between elements of the sequence of estimates. A fourth circuit employs the relationship to provide a signal-to-interference noise ratio prediction for a subsequently received signal. In the illustrative embodiment, the inventive system further includes a circuit for generating a data rate request message based on the signal-to-noise ratio prediction. A special transmitter transmits the data rate request message to the external transmitter. In the specific embodiment, the relationship between elements of the sequence of estimates is based on an average of the elements of the sequence of estimates. The third circuit includes a bank of filters for computing the average. The bank of filters includes finite impulse response filters. Coefficients of the transfer functions associated with each filter in the bank of filters are tailored for different fading environments. The different fading environments include different Rayleigh fading environments, one environment associated with a rapidly moving system, a second environment associated with a slow moving system, and a third system associated with a system moving at a medium velocity. A selection circuit is connected to each of the filter banks and selects an output from one of the filters in the filter bank. The selected output is associated with a filter having a transfer function most suitable to a current fading environment.

36 Claims, 3 Drawing Sheets

FIG. 1  Mobile Station

SYSTEM AND METHOD FOR ACCURATELY PREDICTING SIGNAL TO INTERFERENCE AND NOISE RATIO TO IMPROVE COMMUNICATIONS SYSTEM PERFORMANCE

BACKGROUND OF THE INVENTION

1. Field of Invention

This invention relates to communication systems. Specifically, the present invention relates to systems for predicting the signal to interference and noise ratio (SINR) of a received signal to facilitate data rate control in wireless communication systems.

2. Description of the Related Art

Wireless communication systems are used in a variety of demanding applications including search and rescue and business applications. In addition, wireless communication systems are increasingly employed to transfer computer data in office network and Internet applications. Such applications require efficient and reliable communication systems that can effectively operate in electrically fading and noisy environments and that can handle high data transfer rates.

Cellular telecommunication systems are characterized by a plurality of mobile stations (e.g. cellular telephones or wireless phones) in communication with one or more base stations. The communications link from a base station to a mobile station is the forward link. The communications link from the mobile station to the base station is the reverse link.

Signals transmitted by a mobile station are received by a base station and often relayed to a mobile switching center (MSC). The MSC in turn routes the signal to a public switched telephone network (PSTN) or to another mobile station. Similarly, signals are often transmitted from the public switched telephone network to a mobile station via a base station and a mobile switching center. Each base station governs a cell, a region within which a mobile station may communicate via the base station.

In typical mobile communication systems, information is encoded, modulated, and transmitted over a channel and received, demodulated and decoded by a receiver. In many modern communication systems, such as Code Division Multiple Access (CDMA) cellular networks, the information is encoded digitally for channel noise, capacity, and data security reasons. A convolutional encoder or turbo encoder often performs the encoding of the information.

As is well known in the art, a convolutional encoder converts a sequence of input data bits to a codeword based on a convolution of the input sequence with itself or with another signal. Code rate and generating polynomials are used to define a convolutional code. Convolutional encoding of data combined with a Viterbi decoder is a well-known technique for providing error correction coding and decoding of data. Turbo encoders employ turbo codes, which are serial or parallel concatenations of two or more constituent codes such as convolutional codes.

Mobile communication systems are typified by the movement of a receiver relative to a transmitter or vice versa. The communications link between transmitters and receivers in a mobile communication system is a fading channel. Mobile satellite communications systems, having a transmitter on a spacecraft and a receiver on a ground based vehicle, cellular telephone systems and terrestrial microwave systems are examples of fading communication systems. A fading channel is a channel that is severely degraded. The degradation results from numerous effects including multipath fading, severe attenuation due to the receipt via multiple paths of reflections of the transmitted signal off objects and structures in the atmosphere and on the surface, and from interference caused by other users of the communications system. Other effects contributing to the impairment of the faded channel include Doppler shift due to the movement of the receiver relative to the transmitter and additive noise.

Typically, an information signal is first converted into a form suitable for efficient transmission over the channel. Conversion or modulation of the information signal involves varying a parameter of a carrier wave on the basis of the information signal in such a way that the spectrum of the resulting modulated carrier is confined within the channel bandwidth. At a user location, the original message signal is replicated from a version of the modulated carrier received subsequent to propagation over the channel. Such replication is generally achieved by using an inverse of the modulation process employed by the source transmitter.

In a CDMA system, all frequency resources are allocated simultaneously to all users of the cellular network. Each user employs a noise-like wide band signal occupying the entire frequency allocation. The encoder facilitates the encoding of necessary redundant data within each transmission frame to take advantage of the entire frequency allocation, and also facilitates the variable rate transmission on a frame by frame basis.

For voice communication, the capacity of a CDMA system is maximized by having each user transmit only as much data as is necessary. This is because each user's transmission contributes incrementally to the interference in a CDMA communication system. A very effective means of reducing each user's burden on capacity without reducing the quality of service to that user is by means of variable rate transmission. The use of a variable rate communication channel reduces mutual interference by eliminating unnecessary transmissions when there is no useful speech to be transmitted.

Due to the characteristics of voice communication, power control is typically utilized in a CDMA system to guarantee each user a reliable link for certain fixed data rates. Vocoders can provide variable rate source coding of speech data, using the technique described in U.S. Pat. No. 5,414,796, May 9, 1995, entitled "Variable Rate Vocoder". Once a vocoder generates a sequence of information bits at certain rate, power control will try to adjust the user to transmit as little power as possible that can reliably support the rate. Power control, thus by suppressing each user's contribution to the total interference, facilitates the maximum capacity of a CDMA voice system in the sense that the number of active users is maximized.

For data communication, the parameters, which measure the quality and effectiveness of a system, are the transmission delay required for transferring a data packet and the average throughput rate of the system. Transmission delay is an important metric for measuring the quality of the data communication system. The average throughput rate is a measurement of the efficiency of the data transmission capacity of the communication system. In order to optimize the above parameters for a data communication system, rate control, instead of power control, is typically utilized. The above differences between the voice and data communication systems can be better understood by the following different characteristics between the voice and data communications.

A significant difference between voice services and data services is the fact that the former imposes stringent and fixed delay requirements. Typically, the overall one-way delay of speech frames must be less than 100 msec. In contrast, the data delay can become a variable parameter used to optimize the efficiency of the data communication system. Specifically, more efficient error correcting coding techniques that require significantly larger delays than those that can be tolerated by voice services can be utilized. An exemplary efficient coding scheme for data is disclosed in U.S. patent application Ser. No. 5,933,462, entitled "SOFT DECISION OUTPUT DECODER FOR DECODING CONVOLUTIONALLY ENCODED CODEWORDS", filed Nov. 6, 1996, assigned to the assignee of the present invention and incorporated by reference herein.

Another significant difference between voice services and data services is that the former requires a fixed and common grade of service (GOS) for all users. Typically, for digital systems providing voice services, this translates into a fixed and equal transmission rate for all users and a maximum tolerable value for the error rates of the speech frames. In contrast, for data services, the GOS can be different from user to user and can be a parameter optimized to increase the overall efficiency of the data communication system. The GOS of a data communication system is typically defined as the total delay incurred in the transfer of a predetermined amount of data, hereinafter referred to as a data packet.

Yet another significant difference between voice services and data services is that the former requires a reliable communication link which, in the exemplary CDMA communication system, is provided by soft handoff. Soft handoff results in redundant transmissions from two or more base stations to improve reliability. However, this additional reliability is not required for data transmission because the data packets received in error can be retransmitted. For data services, the transmit power used to support soft handoff can be more efficiently used for transmitting additional data. A method and apparatus which is optimized for the wireless transmission of digital data is described in U.S. patent application Ser. No. 08/963,386 entitled "Method and Apparatus For Higher Rate Packet Data Transmission", which is assigned to the assignee of the present invention and incorporated by reference herein.

As a conclusion of the above characteristics of data communication, a data communication system designed to optimize the average throughput will attempt to serve each user from the best serving base station and at the highest data rate $R_b$ which the user can reliably support. The above conclusion is disclosed in U.S. patent application Ser. No. 08/963,386 entitled "Method and Apparatus For Higher Rate Packet Data Transmission", which is assigned to the assignee of the present invention and incorporated by reference herein. As a result of the above conclusion, in the modern high-data-rate (HDR) system, a base station always transmits at maximum power to only one user at each time slot and uses rate control to adjust the maximum rate that the user can reliably receive. As a characteristic of data communication, throughput is more important to the forward link than reverse link.

A proper rate control algorithm contains 2 loops, an inner loop and an outer loop. The inner loop controls the forward-link data rate based on the difference between the average SINR of the next packet and the SINR thresholds of all the data rates, while the outer loop adjusts the SINR thresholds of the data rates based on the forward link PER. For convenience, the average SINR of a packet and the SINR thresholds of all data rates will be referred to as packet SINR and SINR thresholds, respectively.

The SINR thresholds reflect the performance of the modem design, but are mainly determined by the channel statistics. We expect that the SINR thresholds change slowly with relatively small variances, thus a tracking loop based on PER will achieve good performance. Further details and analysis on how the outer loop can be done is out of the scope of this study.

In this patent, we assume that the SINR thresholds are fixed. We will focus on the design of the inner loop algorithm. The core technique inside the inner loop is channel prediction.

In an HDR system, forward-link traffic channels support 11 data rates, each data rate corresponding to a deterministic packet length associated with 1, 2, 4, 8 or 16 slots. Some packet lengths can support multiple rates. Typically, higher rates are associated with shorter packet lengths.

The predictor will predict the next packet SINR for all packet lengths. The mobile will attempt to request the highest rate by comparing the predictions with the SINR thresholds. For convenience, the prediction of the next packet SINR for a given packet length will be simply referred to as prediction.

In the HDR system, the data rate request information is sent to the BS over the reverse-link data rate control (DRC) channel once every slot. The BS includes a scheduler that schedules forward link traffic packets in accordance with a fair and efficient priority algorithm. Once the scheduler decides to serve a mobile, the mobile is served at the rate it requested over the DRC channel (the actual rate may be lower if the BS does not have enough information bits).

Upon receipt of the data rate request message, the base station adjusts the rate of a transmitted signal. The adjustments are performed for the next packet in response to information provided about the channel by a previous packet. A base station broadcasting at insufficient or excessive data rates results in reduced channel throughput or inefficient use of network resources, respectively.

Current implementations of the above technique however, have significant limitations. The SINR may change rapidly. The data rate that was appropriate for a previously transmitted packet may not be appropriate for a subsequently transmitted packet. The delay between the transmission of one packet and the generation and transmission of a data rate request message for a subsequent packet can result in reduced channel throughput, especially when the channel is characterized by rapid fluctuations in noise or other interference.

Hence, a need exists in the art for an efficient system and method for maximizing communication systems throughput that accounts for a changing SINR occurring between the determination of the rate control signal based on a previous packet and the application of the rate control signal to a subsequent packet. There is a further need for a system for adjusting the data rate of a transmitted signal in accordance with the changing SINR.

SUMMARY OF THE INVENTION

The need in the art is addressed by the system for providing an accurate prediction of a signal-to-interference noise ratio of the present invention. In the illustrative embodiment, the inventive system is employed in a wireless communications system and includes a first mechanism for receiving a signal transmitted across a channel via an external transmitter. A second mechanism generates a sequence of estimates of signal-to-interference noise ratio based on the received signal. A third mechanism determines a relationship between elements of the sequence of estimates. A fourth mechanism employs the relationship to provide a signal-to-interference noise ratio prediction for a subsequently received signal.

In the illustrative embodiment, the inventive system further includes a mechanism for generating a data rate request message based on the signal-to-noise ratio prediction. A transmitter transmits the data rate request message to the external transceiver. The external transceiver includes rate control circuitry for receiving the data rate request message and adjusting a transmission rate of the signal in response thereto.

In the specific embodiment, the relationship between elements of the sequence of estimates is based on an average of the elements of the sequence of estimates. The third mechanism includes a bank of filters for computing the average. The impulse responses of the transfer functions associated with each filter in the bank of filters are tailored for different fading environments. The different fading environments include one environment associated with a rapidly moving system, a second environment associated with a slowly moving system, and a third system associated with a system moving at a medium velocity.

A selection mechanism is connected to each of the filter banks and selects an output from one of the filters in the filter bank. The selected output is associated with a filter having a transfer function most suitable to a current fading environment. In the present specific embodiment, the largest output is selected from the outputs of the filter bank based on the smallest error standard deviation. The resulting accurate prediction of the signal-to-interference noise ratio facilitates generating accurate rate requests.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

CDMA systems generally employ one of two methods to transmit a known pilot signal together with an unknown data signal. The methods include the pilot or reference symbol assisted method and the pilot channel assisted method. In the pilot symbol assisted method, a pilot signal comprising known symbols is spread by a pseudo-noise (PN) sequence and inserted into a data sequence spread by the same PN sequence in preparation for transmission to one or more mobile stations. In the pilot channel assisted method, the pilot signal and the data signal are spread with two different PN sequences, which are then added together and transmitted.

Figure 1:
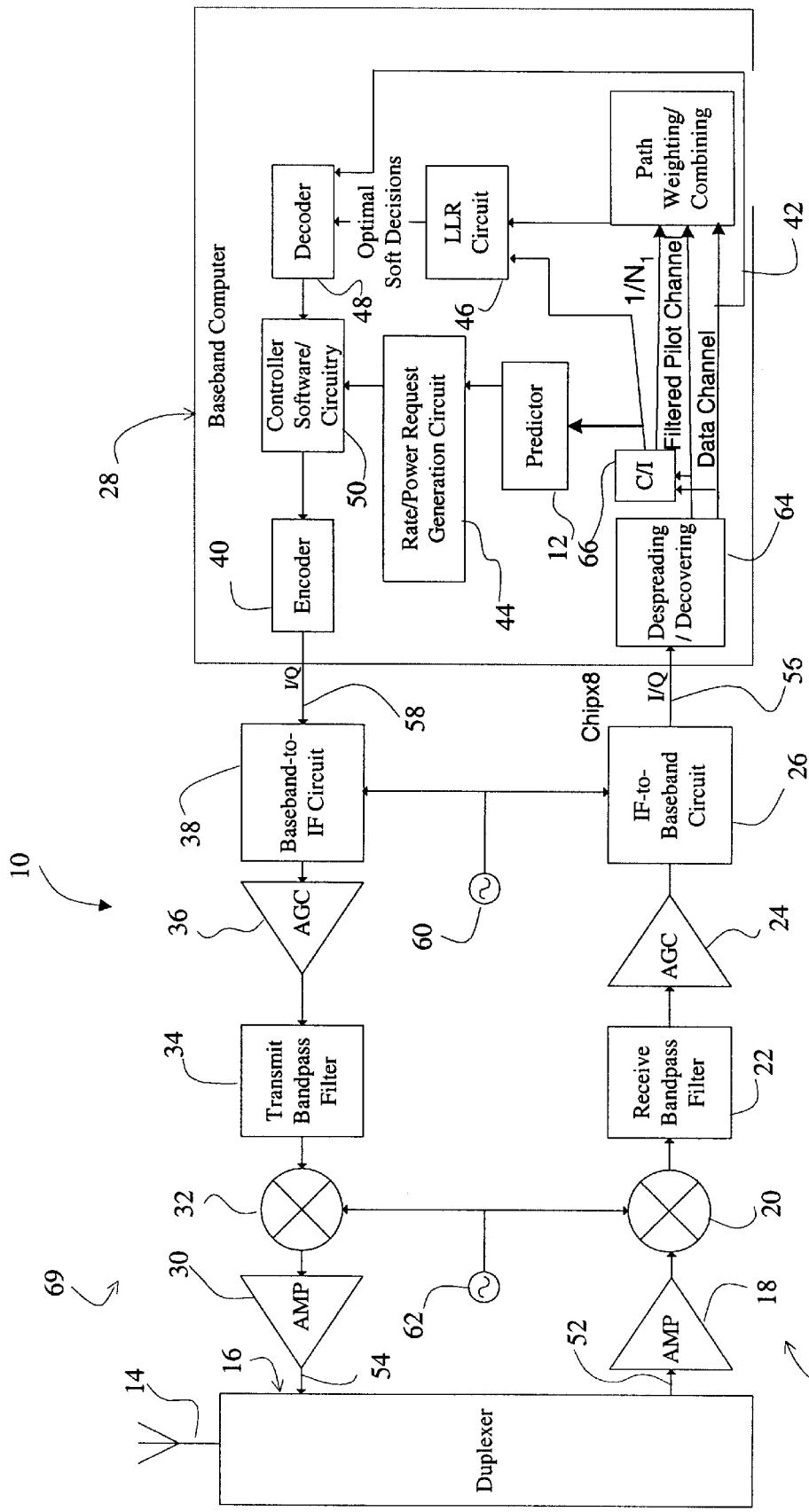
FIG. 1 is a diagram of a wireless communications system transceiver constructed in accordance with the teachings of the present invention and employing a signal to interference and noise ratio (SINR) predictor.

FIG. 1 is a diagram of a wireless communications system transceiver 10 of the present invention employing a signal to interference and noise ratio (SINR) predictor 12. The system 10 represents a CDMA mobile station. Signals received by the transceiver system 10 are received over a forward communications link between a base station (not shown) and the system 10. Signals transmitted by the transceiver system 10 are transmitted over a reverse communications link from the transceiver system 10 to the associated base station.

For clarity, many details of the transceiver system 10 have been omitted, such as clocking circuitry, microphones, speakers, and so on. Those skilled in the art can easily implement the additional circuitry without undue experimentation.

The transceiver system 10 is a dual conversion telecommunications transceiver and includes an antenna 14 connected to a duplexer 16. The duplexer 16 is connected to a receive path that includes, from left to right, a receive amplifier 18, a radio frequency (RF) to intermediate frequency (IF) mixer 20, a receive bandpass filter 22, a receive automatic gain control circuit (AGC) 24, and an IF-to-baseband circuit 26. The IF-to-baseband circuit 26 is connected to a baseband computer 28 at a despreading/decovering circuit 64 in a baseband computer 28.

The duplexer 16 is also connected to a transmit path 69 that includes a transmit amplifier 30, an IF-to-RF mixer 32, a transmit bandpass filter 34, a transmit AGC 36, and a baseband-to-IF circuit 38. The transmit baseband-to-IF circuit 38 is connected to the baseband computer 28 at an encoder 40.

Outputs of the despreading/decovering circuit 64 in the baseband computer 28 are connected to an SINR circuit 66 and a path weighting and combining circuit 42. Outputs of the SINR circuit 66 are connected to the SINR predictor 12, the LLR circuit 46, and the path weighting and combining circuit 42.

An input of a rate request generation circuit 44 is connected to an output of the SINR predictor 12. An output of the log-likelihood ratio (LLR) circuit 46 is connected to an input of a decoder 48, which is a turbo decoder in the present specific embodiment. An input of the LLR circuit 46 is connected to an output of the path weighting and combining circuit 42. An output of the decoder 48 is connected to an input of a controller 50 that is also connected to the rate request generation circuit 44 and to an input of the encoder 40.

The antenna 14 receives and transmits RF signals. A duplexer 16, connected to the antenna 14, facilitates the separation of receive RF signals 52 from transmit RF signals 54.

In operation, RF signals 52 received by the antenna 14 are directed to the receive path 67 where they are amplified by the receive amplifier 18, mixed to intermediate frequencies via the RF-to-IF mixer 20, filtered by the receive bandpass filter 22, gain-adjusted by the receive AGC 24, and then converted to digital baseband signals 56 via the IF-to-baseband circuit 26. The digital baseband signals 56 are then input to a digital baseband computer 28.

In the present embodiment, the receiver system 10 is adapted for use with quadrature phase shift-keying (QPSK) spreading and despreading techniques, and the digital baseband signals 56 are quadrature amplitude modulation (QAM) signals that include both in-phase (I) and quadrature (Q) signal components. The I and Q baseband signals 56 represent both pilot signals and data signals transmitted from a CDMA telecommunications transceiver such as a transceiver employed in a base station.

In the transmit path 66, digital baseband computer output signals 58 are converted to analog signals via the basebandto-IF circuit 38, mixed to IF signals, filtered by the transmit bandpass filter 34, mixed up to RF by the IF-to-RF mixer 32, amplified by the transmit amplifier 30 and then transmitted via the duplexer 16 and the antenna 14.

Both the receive and transmit paths 67 and 69, respectively, are connected to the digital baseband computer 28. The digital baseband computer 28 processes the received baseband digital signals 56 and outputs the digital baseband computer output signals 58. The baseband computer 28 may include such functions as signal to data conversions and/or vise versa.

The baseband-to-IF circuit 38 includes various components (not shown) such as digital-to-analog converters (DACs), mixers, adders, filters, shifters, and local oscillators. The baseband computer output signals 58 include both in-phase (I) and quadrature (Q) signal components that are 90° out of phase. The output signals 58 are input to digital-to-analog converters (DACs) (not shown) in the analog baseband-to-IF circuit 38, where they are converted to analog signals that are then filtered by lowpass filters (not shown) in preparation for mixing. The phases of the output signals 58 are adjusted, mixed, and summed via a 90° shifter (not shown), baseband-to-IF mixers (not shown), and an adder (not shown), respectively, included in the baseband-to-IF circuit 38.

The adder outputs IF signals to the transmit AGC circuit 36 where the gain of the mixed IF signals is adjusted in preparation for filtering via the transmit bandpass filter 34, mixing up to RF via the IF-to-transmit mixer 32, amplifying via the transmit amplifier 20, and eventual radio transmission via the duplexer 16 and the antenna 14.

Similarly, the IF-to-baseband circuit 26 in the receive path 67 includes circuitry (not shown) such as analog-to-digital (ADC) converters, oscillators, and mixers. A received gain-adjusted signals output from the receive AGC circuit 24 are transferred to the IF-to-baseband circuit 26 where they are mixed to baseband via mixing circuitry and then converted to digital signals via analog-to-digital converters (ADCs) (not shown).

Both the baseband-to-IF circuit 38 and the IF-to-baseband circuit 26 employ an oscillator signal provided via a first oscillator 60 to facilitate mixing functions. The receive RF-to-IF mixer 20 and the transmit IF-to-RF mixer 32 employ an oscillator signal input from a second oscillator 62. The first and second oscillators 60 and 62, respectively, may be implemented as phase-locked loops that derive output signals from a master reference oscillator signal (not shown).

Those skilled in the art will appreciate that other types of receive and transmit paths 67 and 69 may be employed instead without departing from the scope of the present invention. The various components such as amplifiers 18 and 30, mixers 20 and 32, filters 22 and 34, AGC circuits 24 and 36, and frequency conversion circuits 26 and 38 are standard components and may easily be constructed by those having ordinary skill in the art and access to the present teachings.

In the baseband computer 28, the received I and Q signals 56 are input to the despreading/decovering circuit 64 where a pilot channel comprising pilot signals and a data channel comprising data signals are extracted from the received I and Q signals 56. The pilot channel and the data channel are provided to the SINR circuit 66 and the path weighting and combining circuit 42 from the despreading/decovering circuit 64.

The SINR circuit 66 outputs a SINR signal comprising a sequence of SINR values, i.e., samples, to the SINR predictor 12 and the LLR circuit 46. The SINR circuit 66 also outputs the reciprocal of the interference energy ($1/N_t$) to the path weighting and combining circuit 42.

The despread and decovered data channel signal, provided by the despreading/decovering circuit 64 to the path weighting and combining circuit 42, is also provided to the decoder 48 where it is decoded and forwarded to the controller 50. At the controller 50, the decoded signal is processed to output voice or data, or to generate a reverse link signal for transfer to the associated base station (not shown).

The path weighting and combining circuit 42 computes optimal ratio path combining weights for multipath components of the received data signal corresponding to the data channel signal, weights the appropriate paths, combines the multiple paths, and provides the summed and weighted paths as a metric to the LLR circuit 46.

The LLR circuit 46 employs metrics from the path weighting and combining circuit 42 with the SINR estimation provided by the SINR circuit 66 to generate optimal LLR and soft decoder decision values. The constructions of applicable LLR circuits are known in the art. In a preferred implementation, the LLR circuit 46 is constructed in accordance with the teachings of U.S. Pat. No. 6,377,607, filed May 13, 1999 entitled SYSTEM AND METHOD FOR PERFORMING ACCURATE DEMODULATION OF TURBO-ENCODED SIGNALS VIA PILOT ASSISTED COHERENT DEMODULATION, assigned to the assignee of the present invention and incorporated herein by reference.

The optimal LLR value is provided to the decoder 48 to facilitate decoding of the received data channel signals. The controller 50 then processes the decoded data channel signals to output voice or data via a speaker or other device (not shown). The controller 50 also controls the sending of speech signals and data signals from an input device (not shown) to the encoder 40 in preparation for transmission.

The rate request generation circuit 44 generates a rate control message based on the predicted SINR value for the next packet as provided by the SINR predictor 12. The SINR predictor 12 employs a filter bank (as discussed more fully below) to facilitate SINR prediction, which enables the rate request generation circuit 44 to provide accurate rate control messages.

The rate request generation circuit 44 compares the predicted SINR with a set of predetermined thresholds. The rate request generation circuit 44 generates a rate control request message based on the relative magnitude of the predicted SINR signal with respect to the various thresholds. The exact details of the rate request generation circuit 44 are application-specific and easily determined and implemented by those ordinarily skilled in the art to suit the needs of a given application.

The rate request generation circuit 44 subsequently provides a rate control message, also termed rate request message, which is transferred to the controller 50. The controller 50 prepares the rate request message for encoding via the encoder 40 and eventual transmission to the associated base station (not shown) over a data rate request channel (DRC) via the transmit path 66, duplexer 16 and antenna 14. When the base station receives the rate request message, the base station adjusts the rate of the transmitted signals accordingly.

The accurate SINR estimates and the total interference noise chip energy N, estimates from the SINR circuit 66 improve the performance of the rate request generation circuit 44 and improve the performance of the decoder 48, thereby improving the throughput and efficiency of the transceiver system 10 and associated telecommunications system.

SINR estimation circuits are known in the art. In a preferred implementation, the SINR circuit 66 is constructed in accordance with the teachings of co-pending U.S. patent application Ser. No. 09/310,053 filed May 11, 1999 SYSTEM AND METHOD FOR PROVIDING AN ACCURATE ESTIMATION OF RECEIVED SIGNAL INTERFERENCE FOR USE IN WIRELESS COMMUNICATIONS SYSTEMS, assigned to the assignee of the present invention and incorporated herein by reference.

The transceiver 10 of FIG. 1 is easily adapted for use in a base station instead of a mobile station, in which case, the transceiver 10 will contain rate and power adjustment functionality built into software running on the controller 50. The appropriate software is easily constructed by those having ordinary skill in the art and access to the present teachings.

While in the present specific embodiment, the predictor 12 provides SINR predictions to the rate request generation circuit 44, those skilled in the art will appreciate that the SINR predictions may be employed by another type of circuit such as a power control circuit without departing from the scope of the present invention.

Figure 2:
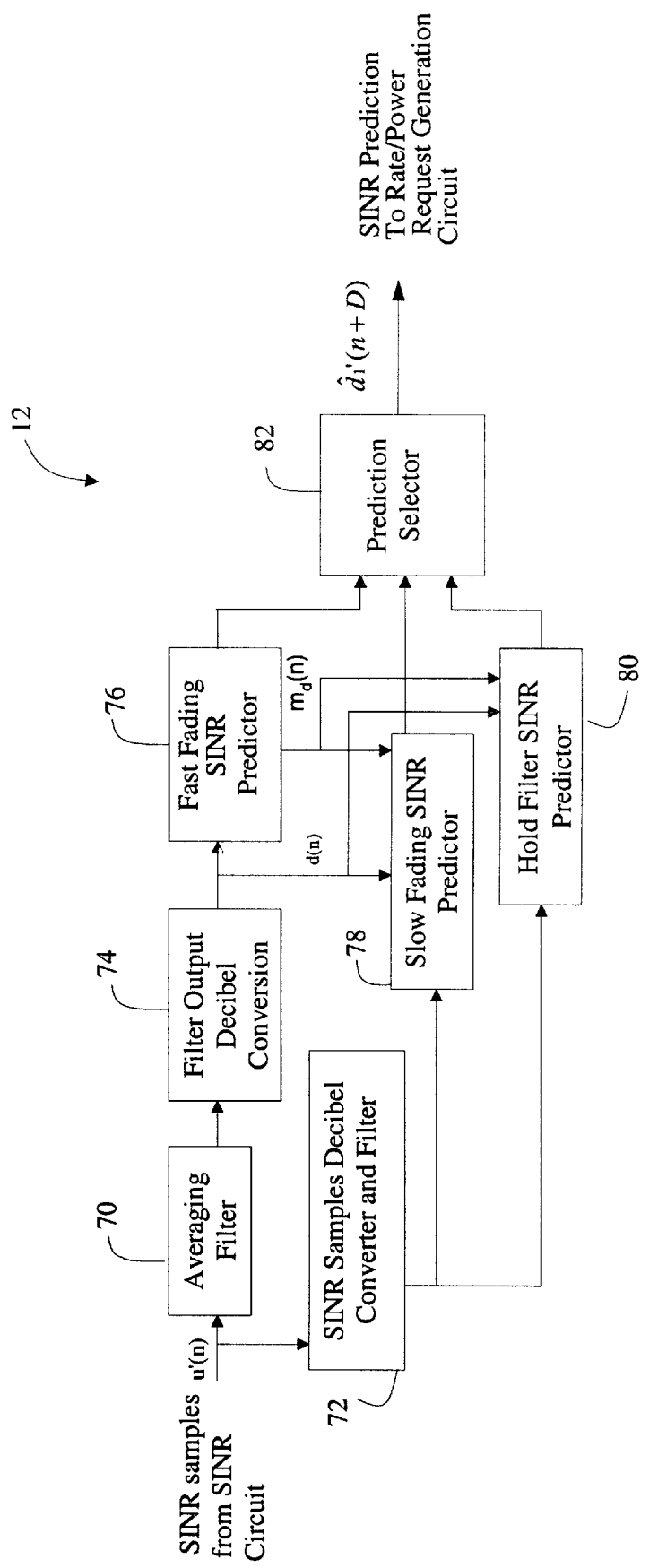
FIG. 2 is a more detailed diagram of the SINR predictor of FIG. 1.

FIG. 2 is a more detailed diagram of the SINR predictor 12 of FIG. 1. The SINR predictor 12 includes a sliding window averaging filter 70 that receives SINR samples from the SINR circuit 66 of FIG. 1 as input. A SINR samples decibel converter and filter 72 also receive the SINR samples as input.

An output of the averaging filter 70 is connected to an input of a filter output decibel converter 74. An output of the decibel converter 74 is connected, in parallel, to an input of a fast fading SINR predictor 76, an input of a slow fading SINR predictor 78, and an input of a hold predictor 80. Outputs of the fast fading SINR predictor 76, the slow fading SINR predictor 78, and the hold predictor 80 are connected to a prediction selector 82. Another output of the fast fading SINR predictor 76 is connected, in parallel, to an input of the slow fading SINR predictor 78 and to an input of the hold predictor 80. An output of the SINR samples decibel converter and filter 72 is connected, in parallel, to an input of the slow fading SINR predictor 78 and an input of the hold predictor 80.

In operation, the averaging filter 70 and the SINR samples decibel converter and filter 72 receive the SINR samples from the SINR circuit 66 of FIG. 1. The averaging filter 70 computes an average of the received SINR samples over a predetermined number of samples. The predetermined number of samples is application-specific and easily determined by those ordinarily skilled in the art to meet the needs of a given application.

The averaged SINR samples output from the averaging filter 70 are converted to decibel scale via the filter output decibel converter 74. The resulting filtered decibel scale SINR samples are then provided, in parallel, to the fast fading SINR predictor 76, the slow fading SINR predictor 78, and the hold predictor 80.

The SINR samples decibel converter and filter 72 filters the received SINR samples and produces the decibel values of the SIR samples as output, the mean of the decibel values being adjusted to zero. The SINR sample decibel converter and filter 72 is application-specific and easily determined by those ordinarily skilled in the art. The resulting converted and filtered samples are provided to the slow fading SINR predictor 78 and the hold predictor 80.

The fast fading SINR predictor 76, the slow fading SINR predictor 78, and the hold predictor 80 form a filter bank. In fast fading signal environments, the fast fading SINR predictor 76 is designed to produce the smallest standard deviation of prediction error as output. Similarly, during slow fading signal environments, the slow fading SINR predictor 78 produces the smallest standard deviation of prediction error as output, and during medium fading signal environments, the hold predictor 80 produces the smallest standard deviation of prediction error as output.

The prediction selector 82 selects from the outputs of the SINR predictors 76, 78, and 80 the signal having the smallest standard deviation of prediction error value, which is most representative of the current fading signal environment. The selected prediction is output from the prediction selector 82, which is easily implemented by those ordinarily skilled in the art. The outputs of the SINR predictors 76, 78, and 80, are backed-off by predetermined factors to prevent overshooting of the SINR prediction as discussed more fully below.

Those skilled in the art will appreciate that a single filter having transfer function coefficients that are selectively changed in accordance with changing fading signal environments may be used in place of the filter bank comprising the SINR filters 76, 78, and 80 without departing from the scope of the present invention. In addition, different filter coefficients and/or additional filters may be employed, without departing from the scope of the present invention.

The SINR predictors 76, 78, and 80 are linear prediction filters and are designed to mimic Wiener filter behavior.

In general, a signal y(n) often contains a signal component x(n) and a noise component w(n) such that y(n)=x(n)+w(n) where n is the sample number. A desired signal is always a linear function of x(n) and can be estimated from y(n). In the present case, x(n) represents the SINR samples.

Prediction is a special case of estimating the desired signal is in advance of a current observation. The desired signal d(n+D) is D samples ahead of y(n), where D is a predetermined number and is greater than or equal to 5 samples in the present embodiment. The difference between a prediction $\hat{d}(n)$ of the desired signal d(n) and the desired signal d(n) is an error e(n). It is well known in the art that the optimum linear filter is a Wiener filter in the sense that it results in a minimum mean-square error.

The desired signal d(n) in the present embodiment is the average SINR over the packet length. Different packet lengths correspond to different desired signals. The transceiver 10 of FIG. 1 runs the predictions for five different packet sizes (1, 2, 4, 8, and 16 slot packets). Upon receipt of a path combined SINR estimate, which is updated every half-slot, the transceiver 10 of FIG. 1 (which corresponds to a mobile station) runs the predictor 12 five times corresponding to the packet sizes of 1, 2, 4, 8, 16 slots, respectively. Hence, the predictor 12 updates the processing shown in FIG. 3 five times for five different packet lengths with different values of parameters like prediction delay and filter coefficients.

Figure 3:
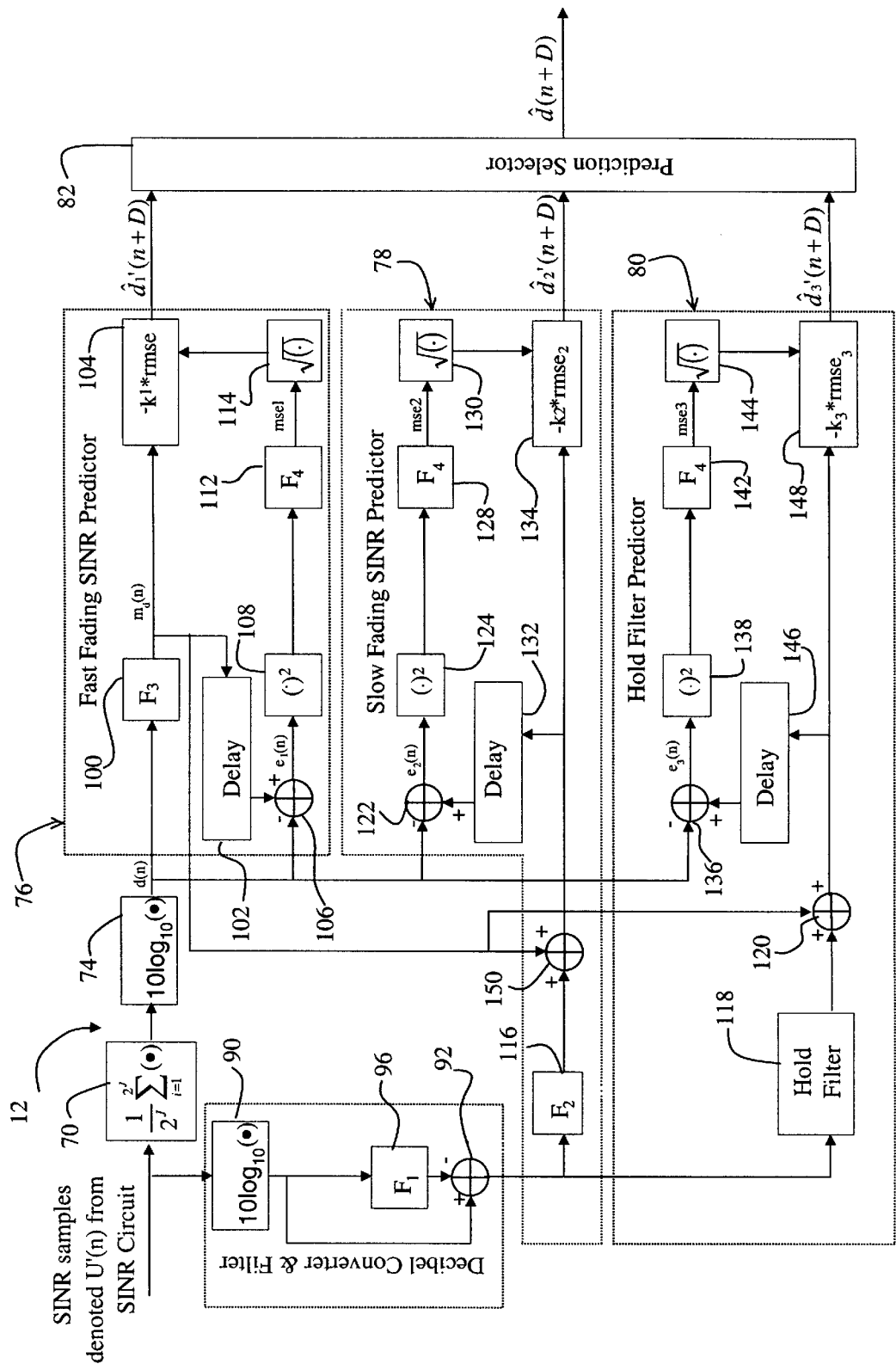
FIG. 3 is a more detailed diagram of the SINR predictor of FIG. 2.

FIG. 3 is a more detailed diagram for the SINR prediction of a given packet length implemented via the SINR predictor 12 of FIG. 2. The SINR samples decibel converter and filter 72 includes a first decibel converter 90, an input of which receives the SINR samples from the SINR circuit 66 of FIG. 1, and an output of which is connected to a positive terminal of a subtractor 92 and an intput of a filter ($F_1$) 96. An output of the filter 96 is connected to terminal of the first subtractor 92.

In operation, the SINR samples decibel converter and filter 72 converts the received SINR samples to decibel scale via the decibel converter 90 and filters the decibel signals via the first filter 96. The filtered decibel samples are subtracted from the decibel samples output from the decibel converter 90. The output of the SINR samples decibel converter and filter 72 is described by the following equation:

$$u_o(n)=u(n)-m_u(n), \qquad [1]$$

where $u_o(n)$ represents the output samples of the SINR samples decibel converter and filter 72; $u(n)$ represents the decibel-scale samples output from the decibel converter 90; and $m_u(n)$ represents the mean of the decibel-scale samples output from the first filter 96.

The transfer function $F_1(z)$ of the first filter 96 is described by the following equation:

$$F_1(z) = \frac{\lambda}{1-(1-\lambda)z^{-1}}, \qquad [2]$$

where $\lambda$ is a constant coefficient and z is a complex variable. The coefficient $\lambda$ is application-specific and is easily determined by those ordinarily skilled in the art to meet the needs of a given application.

The received SINR samples from the SINR circuit 66 of FIG. 1 are also input to the sliding window averaging filter 70. The averaging filter 70 computes an average of the SINR samples over L samples, where L represents the given packet length.

An output of the averaging filter 70 is connected to the filter output decibel converter 74 that converts the output of the averaging filter 70 to decibel scale in accordance with methods well known in the art. The resulting decibel values which represent the desired signal are input to the fast fading SINR predictor 76, the slow fading SINR predictor 78, and the hold predictor 80.

In the fast fading SINR predictor 76, the output of the filter output decibel converter 74 is connected to a negative terminal of a second subtractor 106. An output of the decibel converter 74 is connected to a filter $(F_3)$ 100. An output of the filter 100 is connected to a first delay 102, a first back-off circuit 104, and to a first adder 120 and a second adder 150 in the hold predictor 80 and the slow fading SINR predictor 78, respectively. An output of the first back-off circuit 104 is connected to an input of the prediction selector 82. A second input of the second subtractor circuit is connected to an output of the first delay 102. An output of the second subtractor circuit 106 is connected to a first squaring circuit 108, which has an output connected to an input of the first filter $(F_4)$ 112. An output of the filter 112 is connected to an input of a first square root circuit 114. An output of the first square root circuit 114 is connected to an input of the first back-off circuit 104.

In operation, the fast fading SINR predictor 76 receives the decibel-scale samples from the filter output decibel converter 74 at the filter $F_3$ 100 and at a negative terminal of the second subtractor 106. The filter $F_3$ 100 computes a long-term average of the decibel values and is represented by the following equation:

$$m_d(n)=\hat{d}_1(n+D)=(1-\alpha)m_d(n-1)+\alpha d(n), \qquad [3]$$

where $m_d(n)$ is the long term mean of the received decibel-scale samples at a particular sample n and represents a mean SINR prediction $\hat{d}_1(n+D)$, which is D samples in the future, where D is a predetermined delay based on the given packet length, $\alpha$ is a predetermined coefficient of the transfer function $(F_3)$ of the filter 100; $d(n)$ is the current output from decibel converter 74, and $m_d(n-1)$ long-term average one sample ago. The transfer function F3 of the filter 100 is also described by the following equation:

$$F_3(z) = \frac{\alpha}{1-(1-\alpha)z^{-1}}, \qquad [4]$$

where z is a complex variable, and $\alpha$ is a predetermined coefficient as noted above. $\alpha$ is easily determined by those ordinarily skilled in the art to meet the needs of a given application.

An the resulting long-term average $m_d(n)$ output from the filter 100 is delayed by D samples via the first delay circuit 102 and provided to a positive terminal of the second subtractor 106. The second subtractor subtracts d(n) output from the filter output decibel converter 74 from the long-term average $m_d(n)$ and provides a prediction error signal $e_1(n)$ in response thereto. The resulting error signal $e_1(n)$ is squared and filtered by the squaring circuit 108 and the first filter $F_4$ 112, respectively. The first filter $F_4$ 112 is an infinite impulse response (IIR) filter having a transfer function $F_4(z)$ described by the following equation:

$$F_4(z) = \frac{\beta}{1-(1-\beta)z^{-1}}, \qquad [5]$$

where $\beta$ is a filter coefficient, and the other variables are as described above.

The filtered, i.e., averaged, squared values are input to the square root circuit 114, which computes the square root mean square ($rmse_1$) of the error signal $e_1(n)$. The root means square error $rmse_1$ is provided to the first back-off circuit 104, where $rmse_1$ is multiplied by a predetermined constant $k_1$. The exact value for $k_1$ is application-specific and may be a constant or may be dynamically updated in accordance with a changing signal environment by another circuit (not shown) or software routine.

The root means square error $rmse_1(n)$ is described by the following equation:

$$rmse_1(n)=\sqrt{(1-\beta)\cdot mse_1(n-1)+\beta[e_1(n)]^2}, \qquad [6]$$

where $\beta$ is as given for equation (5); mean square error $mse_1(n-1)$ represents the output from the first filter $F_4$ 112 one sample ago.

The first back-off circuit 104 reduces the first prediction $\hat{d}_1(n+D)$ by $k_1*rmse_1$ to reduce prediction over-shoot. The reduced first prediction is denoted $\hat{d}_1(n+D)$ and is described by the following equation:

$$\hat{d}_1(n+D)=\hat{d}_1(n+D)-k_1\cdot rmse_1(n), \qquad [7]$$

where the variables are as given above.

The structures of the slow-fading SINR predictor 78 and the hold predictor 80 are similar to the structure of the fast fading SINR predictor 76. However, the slow-fading SINR predictor 78 includes an additional filter $F_2$ 116, and the first adder 150. The hold predictor 80 includes an additional hold filter 118 and a second adder 120. The first adder 150 and the second adder 120 receive the long-term mean $m_d(n)$ output from the filter $F_3$ 100 of the fast fading SINR predictor 76.

The slow fading SINR predictor 78, from left to right and from top to bottom, a third subtractor 122, a second squaring circuit 124, a second filter $F_4$ 128, a second square root circuit 130, the filter $F_2$ 116, the first adder 150, a second delay 132, and a second back-off circuit 134.

In operation, the filter $F_2$ 116 filters output from the SINR samples decibel converter and filter 72. The transfer function $F_2(z)$ of the second filter $F_2$ 116 is described by the following equation:

$$F_2(z) = \frac{\mu}{1-(1-\mu)z^{-1}}, \quad [8]$$

where $\mu$ a predetermined filter coefficient. The output $\hat{d}_0(n+D)$ of the second filter $F_2$ 116 is described by the following equation:

$$\hat{d}_0(n+D)=(1-\mu)\hat{d}_0(n+D-1)+\mu u_0(n), \quad [9]$$

where $\mu$ is as given above; $\hat{d}_0(n+D-1)$ is the output $\hat{d}_0(n+D)$ delayed by one sample; and $u_0(n)$ is the output of the SINR samples decibel converter and filter 72.

The output of the filter $F_2$ 116 as described by equation (9) is input to a terminal of the first adder 150, which adds the output of the long-term average $m_d(n)$, which is provided from the fast fading SINR predictor 76. The resulting sum is denoted $\hat{d}_2(n+D)$ and is described by the following equation:

$$\hat{d}_2(n+D)=\hat{d}_0(n+D)+m_d(n), \quad [10]$$

where the variables are as given above.

The output of the first adder 150 as given by equation (10) is input, in parallel, to the second delay 132 and the second back-off circuit 134. The delay 132 delays the output of the first adder 150 by D and provides the result to a positive terminal of the third subtractor 122. The third subtractor subtracts the output d(n) of the filter output decibel converter 74 from the delayed result to yield a second error signal $e_2(n)$, which is described by the following equation:

$$e_2(n)=\hat{d}_2(n)-d(n), \quad [11]$$

where $\hat{d}_2(n)$ is the delayed output of the first adder 150, i.e., is the output of the second delay 132, and d(n) is the output of the filter output decibel converter 74.

The resulting error signal $e_2(n)$ is squared and filtered by the second squaring circuit 124 and the second filter $F_4$ 128, respectively. The transfer function of the second filter $F_4$ 128 is as described in equation (5). The square root of the output of the filter $F_4$ 128 is computed by the second square root circuit 130 and yields the following output:

$$rmse_2(n)=\sqrt{(1-\beta)mse_2(n-1)+\beta[e_{2(n)}]^2}, \quad [12]$$

where $rmse_2(n)$ is the root mean square error of the signal $e_2(n)$; mean square error $mse_2(n-1)$ is the output of second filter $F_4$ 128 delayed by one sample; and the other variables and constants are as given above.

The resulting root means square error $rmse_2(n)$ is multiplied by a predetermined factor k, and the result is subtracted from the output of the first adder 150 to yield the following output:

$$\hat{d}_2(n+D)=\hat{d}_2(n+D)-k_2 \cdot rmse_2(n), \quad [13]$$

where the constants and variables are as described above. The output $d_2'(n+D)$ of the second back-off circuit 134 is provided to the prediction selector 82.

The predetermined factor $k_2$ that is application specific and easily determined by those ordinarily skilled in the art. The factor $k_2$ may be equivalent to the factors $k_1$ and $k_3$ employed in the first back-off circuit 104 and the third back-off circuit 148 and may be dynamically altered without departing from the scope of the present invention.

The hold predictor 80 includes, from left to right and from top to bottom, a fourth subtractor 136, a third squaring circuit 138, a third filter $F_4$ 142, a third square root circuit 144, a third delay circuit 146, the hold filter circuit 118, the second adder 120, and a third back-off circuit 148.

In the present specific embodiment, the hold predictor 80 is only employed when the packet length is less than or equal to 2 slots. The hold predictor 80 is selectively activated by a circuit (not shown) that determines when the packet length is less than or equal to 2 slots and selectively enables the output of the hold predictor In operation, the hold filter circuit 118 filters the output of the SINR samples decibel converter and filter 72 and provides the result to a terminal of the second adder 120, which adds the output $m_d(n)$ of the filter 100 of the fast fading SINR predictor 76. The output of the adder 120 is described by the following equation:

$$\hat{d}_3(n+D)=u_0(n) \cdot HoldWeight+m_d(n), \quad [14]$$

where the HoldWeight is provided by the hold filter circuit 118, and $u_0(n)$ is the output of the SIR samples decibel converter and filter 72.

The resulting output is delayed by D samples by the third delay 146 to yield $\hat{d}_3(n)$. The output d(n) of the filter output decibel converter 74 is then subtracted from the delayed samples $\hat{d}_3(n)$ to yield a third error signal $e_3(n)$ described by the following equation:

$$e_3(n)=\hat{d}_3(n)-d(n), \quad [15]$$

where the variables are as given above.

The subsequent third squaring circuit 138, the third filter $F_4$ 142, and the third square root circuit 144 compute the root mean square error signal $rmse_3(n)$ of the error signal $e_3(n)$, which is described by the following equation:

$$rmse_3(n)=\sqrt{(1-\beta)mse_3(n-1)+\beta[e_{3(n)}]^2}, \quad [16]$$

where mean square error $mse_3(n-1)$ is the output of third filter $F_4$ 142 delayed by one sample, and the other constants and variables are as given above. The transfer function of the third filter $F_4$ 142 is as given in equation (5).

The resulting root mean square error $rmse_3(n)$ is multiplied by the predetermined constant $k_3$ via the third back-off circuit 148. The result is subtracted from the output $\hat{d}_3(n+D)$ of the second adder 120 to yield the following output:

$$\hat{d}_3(n+D)=\hat{d}_3(n+D)-k_3 \cdot rmse_3(n), \quad [17]$$

where the constants and variables are as given above. The result given by equation (17) is provided to the prediction selector circuit 82.

The prediction selector 82 chooses the prediction with the smallest rmse value as a final prediction for the given packet length. For 1 and 2 slot packets, the prediction selector 82 chooses from the fast fading predictor 76, the slow fading predictor 78, and the hold predictor 80. For 4, 8, and 16 slot packets, the prediction selector 82 chooses from the fast filter 76 and the slow fading filter 78.

The delays 102, 132, and 146 provide delays of D half slots, where D is the prediction latency for the given packet length. The predictor 12 receives SINR estimation samples once every half slot but only produces packet average SINR predictions once every two half slots. In addition, the filter $F_1$ 96 is applied once every half slot, the filters 100, 112, 116, 128, and 142 having the transfer functions $F_2$, $F_3$, and $F_4$ are applied once every two half slots. The descriptions of the transfer functions $F_1(z)$, $F_2(z)$, $F_3(z)$, and $F_4(z)$ neglect the effects of decimation processing. However, those having ordinary skill in the art can easily adjust the transfer functions accordingly.

Those skilled in the art will appreciate that the SINR predictor 12 may be implemented in software without departing from the scope of the present invention, in which case, the filters 96, 100, 112, 128, 142, and 116 are easily switched on or off in accordance with the above rules.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

Accordingly,

What is claimed is:

1. A method for receiving a signal comprising:
   measuring the signal to form a sequence of consecutive signal-to-interference noise ratio estimates;
   filtering said estimates according to each of a plurality of predetermined fading environments to form a plurality of sequences of signal-to-interference noise ratio predictions, wherein each of said plurality of sequences of signal-to-interference noise ratio predictions corresponds to one of said plurality of predetermined fading environments;
   comparing each of said plurality of sequences of signal-to-interference noise ratio predictions to at least one signal-to-interference noise ratio estimate subsequent to said sequence to form a plurality of prediction errors, wherein each of said plurality of prediction errors corresponds to one of said plurality of predetermined fading environments;
   forming a predicted signal-to-interference noise ratio based on said plurality of sequences of signal-to-interference noise ratio predictions and said plurality of prediction errors.

2. The method of claim 1 wherein said plurality of predetermined fading environments comprises a slow fading environment.

3. The method of claim 2 wherein said plurality of predetermined fading environments further comprises a fast fading environment.

4. The method of claim 1 wherein said plurality of predetermined fading environments comprises a fast fading environment.

5. The method of claim 1 wherein said filtering comprises performing an average of said estimates.

6. The method of claim 1 wherein said filtering comprises filtering said estimates in accordance with a finite impulse response filter.

7. The method of claim 1 wherein said filtering comprises filtering said estimates in accordance with an infinite impulse response filter.

8. The method of claim 7 wherein said filtering further comprises filtering said estimates in accordance with a finite impulse response filter.

9. The method of claim 1 wherein said forming a predicted signal-to-interference noise ratio comprises selecting one of said plurality of prediction errors.

10. The method of claim 1 further comprising adjusting said predicted signal-to-interference noise ratio by a back-off value.

11. The method of claim 10, wherein said back-off value is constant.

12. The method of claim 10 further comprising adjusting said back-off value in accordance with a changing signal environment.

13. An apparatus for receiving a signal comprising:
   a signal-to-interference ratio circuit for measuring the signal to form a sequence of consecutive signal-to-interference noise ratio estimates;
   a bank of filters for filtering said estimates according to each of a plurality of predetermined fading environments to form a plurality of sequences of signal-to-interference noise ratio predictions, wherein each of said plurality of sequences of signal-to-interference noise ratio predictions corresponds to one of said plurality of predetermined fading environments;
   a prediction selector for comparing each of said plurality of sequences of signal-to-interference noise ratio predictions to at least one signal-to-interference noise ratio estimate subsequent to said sequence to form a plurality of prediction errors, wherein each of said plurality of prediction errors corresponds to one of said plurality of predetermined fading environments, and forming a predicted signal-to-interference noise ratio based on said plurality of sequences of signal-to-interference noise ratio predictions and said plurality of prediction errors.

14. The apparatus of claim 13 wherein said bank of filters comprises a slow fading signal-to-interference noise predictor.

15. The apparatus of claim 14 wherein said bank of filters further comprises a fast fading signal-to-interference noise predictor.

16. The apparatus of claim 14 wherein said bank of filters further comprises a hold filter predictor.

17. The apparatus of claim 13 wherein said bank of filters comprises a fast fading signal-to-interference noise predictor.

18. The apparatus of claim 13 wherein said bank of filters comprises a hold filter predictor.

19. The apparatus of claim 13 wherein said bank of filters comprises a finite impulse response filter.

20. The apparatus of claim 13 wherein said bank of filters comprises an infinite impulse response filter.

21. The apparatus of claim 20 wherein said bank of filters further comprises a finite impulse response filter.

22. The apparatus of claim 13 further comprising a back-off circuit for adjusting said predicted signal-to-interference noise ratio by a back-off value.

23. The apparatus of claim 22, wherein said back-off circuit is configured to provide a constant back-off value.

24. The apparatus of claim 22 wherein said back-off circuit is configured to adjust said back-off value in accordance with a changing signal environment.

25. A method for receiving a signal comprising:
   means for measuring the signal to form a sequence of consecutive signal-to-interference noise ratio estimates;
   means for filtering said estimates according to each of a plurality of predetermined fading environments to form a plurality of sequences of signal-to-interference noise ratio predictions, wherein each of said plurality of sequences of signal-to-interference noise ratio predictions corresponds to one of said plurality of predetermined fading environments;
   means for comparing each of said plurality of sequences of signal-to-interference noise ratio predictions to at least one signal-to-interference noise ratio estimate subsequent to said sequence to form a plurality of prediction errors, wherein each of said plurality of prediction errors corresponds to one of said plurality of predetermined fading environments;

means for forming a predicted signal-to-interference noise ratio based on said plurality of sequences of signal-to-interference noise ratio predictions and said plurality of prediction errors.

26. The apparatus of claim 25 wherein said plurality of predetermined fading environments comprises means for filtering said estimates according to a slow fading environment.

27. The apparatus of claim 26 wherein said plurality of predetermined fading environments further comprises means for filtering said estimates according to a fast fading environment.

28. The apparatus of claim 25 wherein said plurality of predetermined fading environments comprises means for filtering said estimates according to a fast fading environment.

29. The apparatus of claim 25 wherein said filtering comprises means for performing an average of said estimates.

30. The apparatus of claim 25 wherein said filtering comprises filtering said estimates in accordance with a finite impulse response filter.

31. The apparatus of claim 25 wherein said filtering comprises an infinite impulse response filter.

32. The apparatus of claim 31 wherein said filtering further comprises a finite impulse response filter.

33. The apparatus of claim 25 wherein said means for forming comprises means for selecting one of said plurality of prediction errors.

34. The apparatus of claim 25 further comprising means for adjusting said predicted signal-to-interference noise ratio by a back-off value.

35. The apparatus of claim 34, wherein said means for adjusting is configured to apply a constant back-off value.

36. The apparatus of claim 34 further comprising means for adjusting said back-off value in accordance with a changing signal environment.

\* \* \* \* \*

UNITED STATES PATENT AND TRADEMARK OFFICE
CERTIFICATE OF CORRECTION

PATENT NO.    : 6,426,971 B1
DATED         : July 30, 2002
INVENTOR(S)   : Wu et al.

It is certified that error appears in the above-identified patent and that said Letters Patent is hereby corrected as shown below:

<u>Title page,</u>
Item [75], Inventors, please delete "Sindhushayna" and insert -- Sindhushayana --.

Signed and Sealed this

Seventeenth Day of June, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,426,971 B1 Page 1 of 1
APPLICATION NO. : 09/394980
DATED : July 30, 2002
INVENTOR(S) : Qiang Wu et al.

It is certified that error appears in the above-identified patent and that said Letters Patent is hereby corrected as shown below:

Column 16, line 55, Claim 25, please replace "A method" with --An apparatus--.

Signed and Sealed this

Twenty-sixth Day of February, 2008

JON W. DUDAS
*Director of the United States Patent and Trademark Office*